United States Patent
Kuji et al.

(10) Patent No.: US 7,663,531 B2
(45) Date of Patent: Feb. 16, 2010

(54) SECONDARY SURVEILLANCE RADAR SYSTEM, AND GROUND SYSTEM FOR USE THEREIN

(75) Inventors: Yoshinori Kuji, Yokohama (JP); Yoshirou Aoki, Yokohama (JP); Hisashi Ootomo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 11/224,233

(22) Filed: Sep. 13, 2005

(65) Prior Publication Data

US 2006/0181447 A1 Aug. 17, 2006

(30) Foreign Application Priority Data

Sep. 15, 2004 (JP) ............................ 2004-268760

(51) Int. Cl.
  *G01S 13/76* (2006.01)
(52) U.S. Cl. ............................ 342/32; 342/30; 342/36; 342/37; 342/40
(58) Field of Classification Search .................. 342/29, 342/33, 36, 32, 37
See application file for complete search history.

(56) References Cited

U.S. PATENT DOCUMENTS

| | | | | |
|---|---|---|---|---|
| 3,801,980 A | * | 4/1974 | Danton et al. .................. | 342/45 |
| 4,454,510 A | * | 6/1984 | Crow ............................ | 342/32 |
| 5,144,315 A | * | 9/1992 | Schwab et al. ................. | 342/49 |
| 5,196,856 A | * | 3/1993 | Litchford et al. ............. | 342/455 |
| 5,572,214 A | | 11/1996 | Ringel | |
| 5,726,630 A | * | 3/1998 | Marsh et al. ................. | 340/10.2 |
| 5,774,811 A | * | 6/1998 | Uchida ......................... | 455/509 |
| 5,825,322 A | | 10/1998 | Capozoli | |
| 5,856,788 A | * | 1/1999 | Walter et al. ................ | 340/10.2 |
| 5,941,929 A | * | 8/1999 | Shiomi et al. ................ | 701/120 |
| 5,999,116 A | * | 12/1999 | Evers ............................ | 342/36 |
| 6,169,497 B1 | * | 1/2001 | Robert ......................... | 340/988 |

(Continued)

FOREIGN PATENT DOCUMENTS

JP  51-1088  1/1976

(Continued)

OTHER PUBLICATIONS

Stevems Michael C., "Secondary Surveillance Radar", ISBN 0-89006, 1998, 8 pages.

(Continued)

*Primary Examiner*—Thomas H Tarcza
*Assistant Examiner*—Matthew M Barker
(74) *Attorney, Agent, or Firm*—Oblon, Spivak, McClelland, Maier & Neustadt, L.L.P.

(57) ABSTRACT

A secondary surveillance radar system comprising a including a ground system which observes an observation area where an aircraft equipped with a mode S transponder and an aircraft equipped with an ATCRBS transponder possibly coexist, wherein the ground system comprises includes a transmit processor which transmits to the observation area an all-call interrogation signal specific for mode S including an identification code of the ground system, a receive processor which receives a reply signal to the interrogation signal transmitted by the transmit processor, and a recognition processor which recognizes the reply signal as a processing target when identification information included in the reply signal received by the receive processor coincides with the identification code of the ground system, and wherein the recognition processor recognizes the reply signal as the processing target also when the identification information included in the reply signal received by the receive processor coincides with null information.

8 Claims, 9 Drawing Sheets

U.S. PATENT DOCUMENTS

| | | | |
|---|---|---|---|
| 6,211,811 B1 * | 4/2001 | Evers | 342/36 |
| 6,222,480 B1 | 4/2001 | Kuntman et al. | |
| 6,337,652 B1 * | 1/2002 | Shiomi et al. | 342/37 |
| 6,344,820 B1 * | 2/2002 | Shiomi et al. | 342/174 |
| 6,359,885 B1 * | 3/2002 | Kim et al. | 370/390 |
| 6,384,783 B1 * | 5/2002 | Smith et al. | 342/387 |
| 6,744,396 B2 * | 6/2004 | Stone et al. | 342/36 |
| 6,778,133 B1 * | 8/2004 | Cole et al. | 342/357.03 |
| 7,049,709 B2 * | 5/2006 | Boggs | 307/10.2 |
| 2002/0063653 A1 | 5/2002 | Oey et al. | |
| 2004/0189521 A1 * | 9/2004 | Smith et al. | 342/387 |
| 2004/0263380 A1 * | 12/2004 | Cole et al. | 342/36 |
| 2005/0024256 A1 * | 2/2005 | Ridderheim et al. | 342/29 |
| 2005/0083226 A1 * | 4/2005 | Kuji et al. | 342/29 |
| 2005/0156777 A1 * | 7/2005 | King et al. | 342/29 |

FOREIGN PATENT DOCUMENTS

| | | |
|---|---|---|
| JP | 63-27781 | 2/1988 |
| JP | 4113080 | 4/2008 |

OTHER PUBLICATIONS

M. C. Stevens, "Secondary Surveillance Radar", Secondary Surveillance Radar, XP-002154909, 1988, 30 pages.

"Manual of the Secondary Surveillance Radar (SSR) Systems", International Civil Aviation Organization, 1998, Doc. 9684-AN/951, p. 6-2 and p. 6-26.

* cited by examiner

SECONDARY SURVEILLANCE RADAR SYSTEM, AND GROUND SYSTEM FOR USE THEREIN

CROSS-REFERENCE TO RELATED APPLICATIONS

This application is based upon and claims the benefit of priority from prior Japanese Patent Application No. 2004-268760, filed Sep. 15, 2004, the entire contents of which are incorporated herein by reference.

BACKGROUND OF THE INVENTION

1. Field of the Invention

The present invention relates to a secondary surveillance radar system comprising an airborne system and a ground system. The airborne system is a system loaded on an aircraft, such as a mode S transponder or an ATCRBS transponder. The ground system transmits an interrogation signal to the airborne system, and flight control is performed in accordance with a reply signal to the interrogation signal.

2. Description of the Related Art

A secondary surveillance radar (SSR) system comprises a ground system for transmitting interrogation signals to an aircraft and an airborne system for returning reply signals in reply to the interrogation signals. Conventionally, an ATCRBS (Air Traffic Control Radar Beacon System) transponder is used as the airborne system. In addition, in recent years, the number of aircrafts including mode S transponders (SSR mode S) has been increased. A mode S transponder has a function of incorporating various information into reply signals. By virtue of this function, the mode S transponder can transmit a larger amount of information to the ground system. The method of transmitting interrogation signals is variously designed in order that the ground system could acquire both the ATCRBS transponder and the mode S transponder.

In the SSR system, the time period for which interrogation signals are transmitted is divided into all-call time periods and roll-call time periods in units of one sweep time period of a radar. The all-call time period is a time 30 period for acquiring the mode S transponder and the ATCRBS transponder. Especially, an all-call interrogation signal specific for mode S is transmitted to the mode S transponder and an all-call interrogation signal specific for mode A/C is transmitted to the ATCRBS transponder for the all-call time periods in the SSR mode S.

However, in the existing systems, some of the transponders may not be acquired by the ground system even though they actually exist. The reason for this is explained below.

First, when the all-call interrogation signal specific for mode S is transmitted, the mode S transponder receives this interrogation signal, and then returns the reply signal to the ground system. At that moment, the mode S transponder sets an interrogator identifier (II) included in the received all-call interrogation signal into a PI field of the reply signal according to a rule. The interrogator identifier (hereinafter, referred to as "II") is one of the codes (1 to 15) used to identify a Mode S ground system using the multisite protocols. At this time, there may appear a transponder returning a reply in which a value of the PI field is "0". When viewed from the ground system, the II indicated by this reply signal seems different from the II of the ground system itself, so that the ground system excludes this reply signal from processing targets. This causes a serious problem that the transponder which has transmitted the reply signal is not acquired, and that presence of the aircraft equipped with this transponder cannot be recognized by the ground system.

Next, when the all-call interrogation signal specific for mode A/C is transmitted, the reply signal from the ATCRBS transponder is normally returned to the ground system. However, there exist transponders which erroneously recognize a P4 pulse. In this case, since the reply signal is not returned, the ATCRBS transponder is not acquired, and the aircraft is not recognized either. Further, there are also ATCRBS transponders which erroneously recognize the all-call interrogation signal specific for mode S and thus return illegal replies, and this also leads to a serious situation.

It should be noted that a related technique is disclosed on pages 227-233 of "Radar Engineering Revised Edition" written by Takashi Yoshida, and published by the Institute of Electronics, Information and Communication Engineers (1996). This literature discloses a secondary surveillance radar in detail.

As described above, some transponders may not be acquired in the existing secondary surveillance radar system. This causes a serious problem to flight surveillance, and some measures are therefore desired for improvement.

BRIEF SUMMARY OF THE INVENTION

According to an aspect of the present invention, there is provided a secondary surveillance radar system comprising a ground system which observes an observation area where an aircraft equipped with a mode S transponder and an aircraft equipped with an ATCRBS transponder possibly coexist, wherein the ground system comprises: a transmit processor which transmits to the observation area an all-call interrogation signal specific for mode S including an identification code of the ground system; a receive processor which receives a reply signal to the interrogation signal transmitted by the transmit processor; and a recognition processor which recognizes the reply signal as a processing target when identification information included in the reply signal received by the receive processor coincides with the identification code of the ground system, and wherein the recognition processor recognizes the reply signal as the processing target also when the identification information included in the reply signal received by the receive processor coincides with null information.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
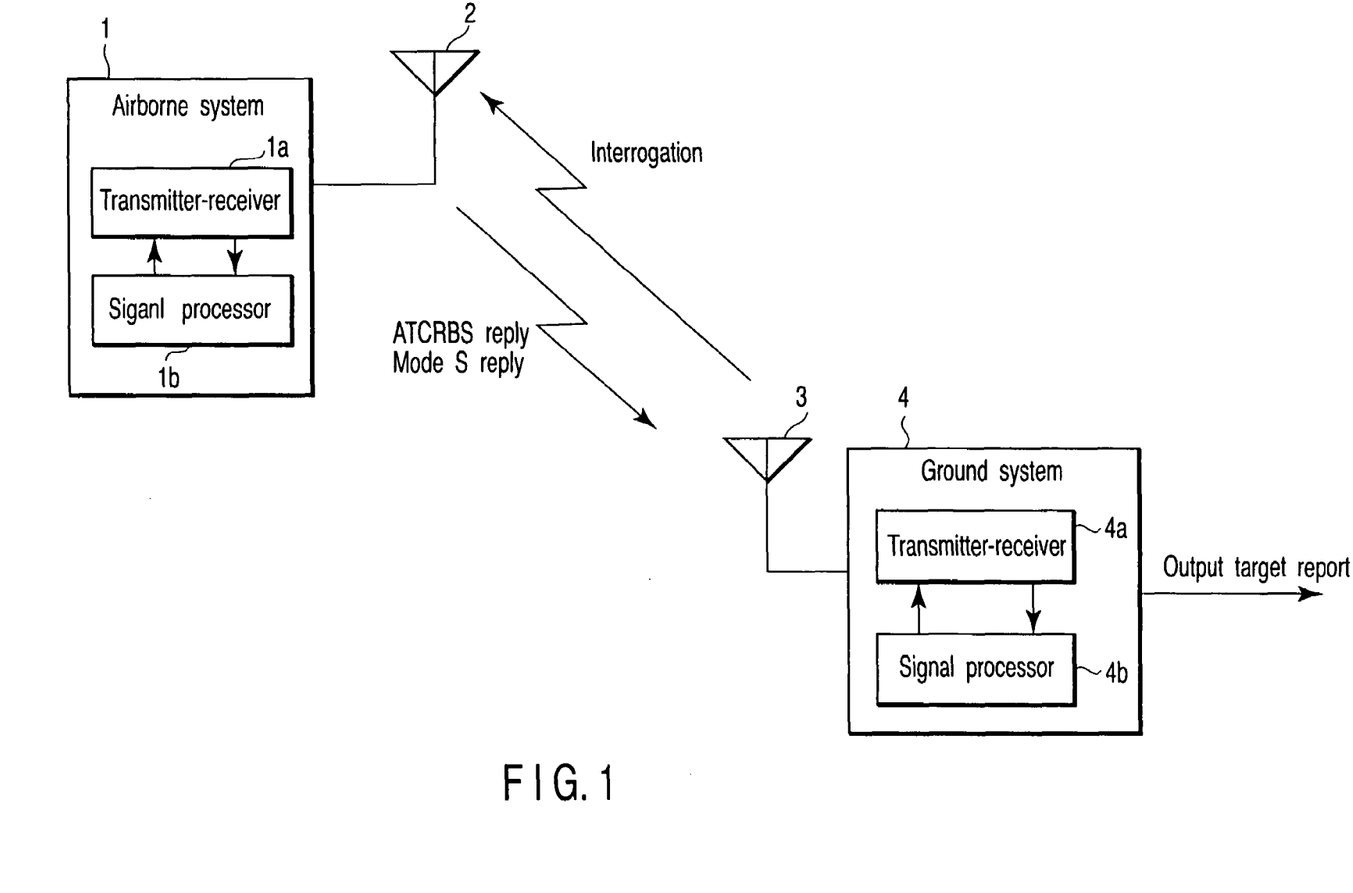
FIG. 1 is a system diagram showing one embodiment of a secondary surveillance radar system according to the present invention.

FIG. 1 is a system diagram showing one embodiment of a secondary surveillance radar system according to the present invention. This system is based on a so-called SSR mode S, and comprises an airborne system 1 loaded on an aircraft, and a ground system 4 which is placed on the ground and which acquires the aircraft. The airborne system 1 is a mode S transponder or an ATCRBS transponder. In the present embodiment, a case is assumed wherein the aircraft equipped with the mode S transponder and the aircraft equipped with the ATCRBS transponder coexist within an observation area of the airborne system 1.

The ground system 4 comprises a transmitter-receiver 4a and a signal processor 4b. The transmitter-receiver 4a transmits an interrogation signal to the observation area via an antenna 3, and receives a reply signal. The signal processor 4b generates the interrogation signal, and obtains a target report for each aircraft from the reply signal, and then outputs the target report. The interrogation signal includes an all-call interrogation signal specific for mode S, an roll-call interrogation signal specific for mode S and an all-call interrogation signal specific for mode A/C.

The airborne system comprises a transmitter-receiver 1a and a signal processor 1b. The transmitter-receiver 1a receives the interrogation signal and then returns the reply signal. The signal processor 1b generates the reply signal to the received interrogation signal.

Figure 2:
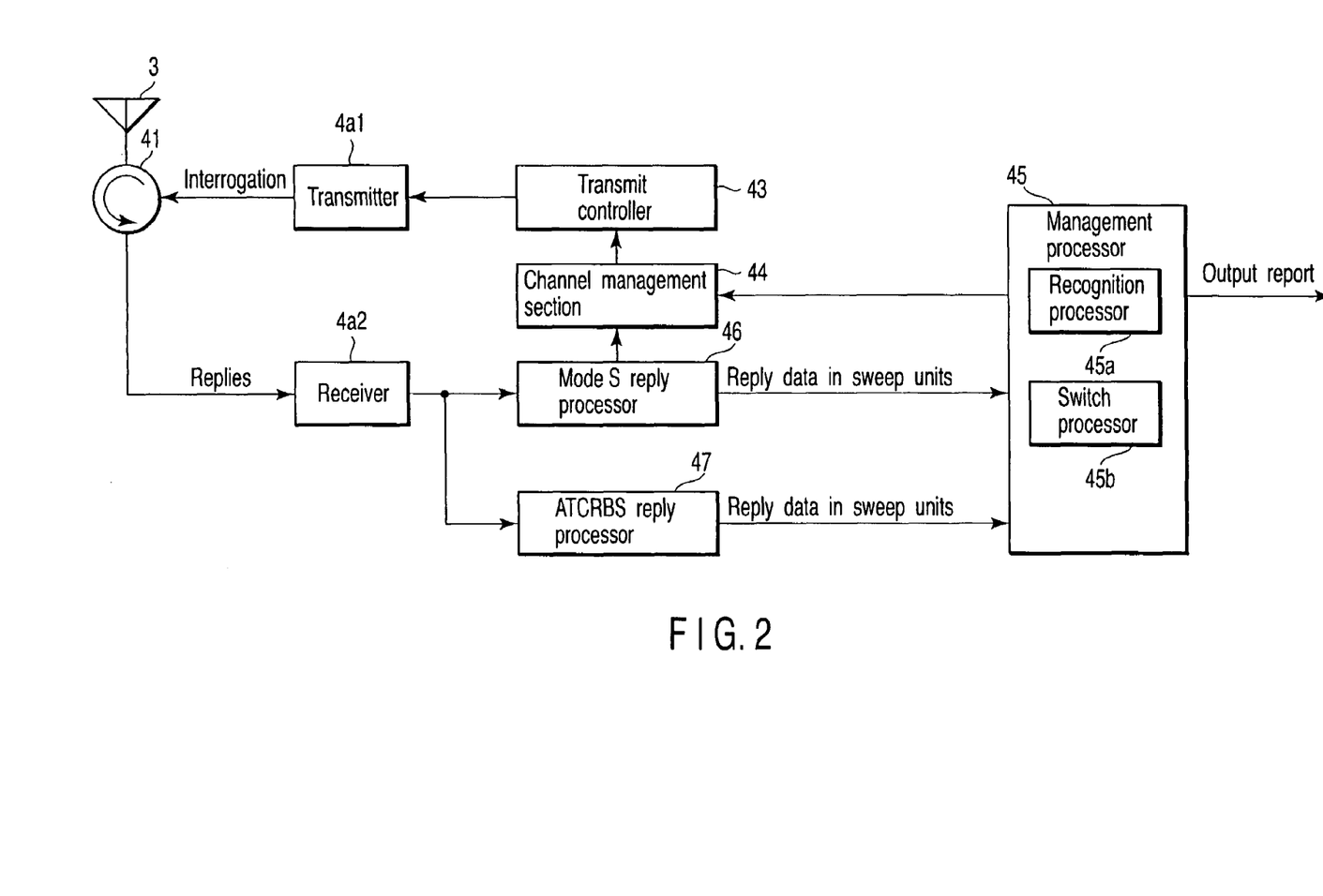
FIG. 2 is a functional block diagram showing a ground system 4 of FIG. 1 in greater detail.

FIG. 2 is a functional block diagram showing the ground system 4 of FIG. 1 in greater detail. In FIG. 2, a transmit controller 43 generates the interrogation signal including the II of the ground system 4. A transmitter 4a1 controlled by the transmit controller 43 feeds the interrogation signal while controlling transmission timing. The interrogation signal is transmitted to the observation area via a circulator 41 and the antenna 3.

On the other hand, the reply signal is input from the antenna 3 to a receiver 4a2 via the circulator 41, and received and demodulated therein. The received reply signal is input to one of a mode S reply processor 46 and an ATCRBS reply processor 47 depending on a receiving time slot. Then, reply data in sweep units on each reply signal is generated. Each reply data is provided to a management processor 45. The management processor 45 controls a channel management section 44 to switch transmission channels of the interrogation signal generated by the transmit controller 43.

The transmit controller 43 randomly varies a time interval extending from a transmission termination point of the all-call interrogation signal specific for mode S to a subsequent transmission start point of the all-call interrogation signal specific for mode A/C. Preferably, this time interval is made greater than a dead time of the ATCRBS transponder.

The management processor 45 comprises a recognition processor 45a and a switch processor 45b. When identification information included in the reply signal received by the receiver 4a2 coincides with the II of the ground system 4, the recognition processor 45a recognizes this reply signal as a target for processing. When the identification information coincides with null information, the recognition processor 45a also recognizes this reply signal including this identification information as the target for processing. The null information is information corresponding to a numerical code "0".

The switch processor 45b selectively switches a function of the recognition processor 45a into two states. That is, the switch processor 45b selectively switches to validate/prohibit (switches on/off) the function of the recognition processor 45a to recognize the reply signal in which the null information is described. A user enters a command via, for example, a graphical user interface (GUI), thereby achieving such selective designation.

Figure 3:
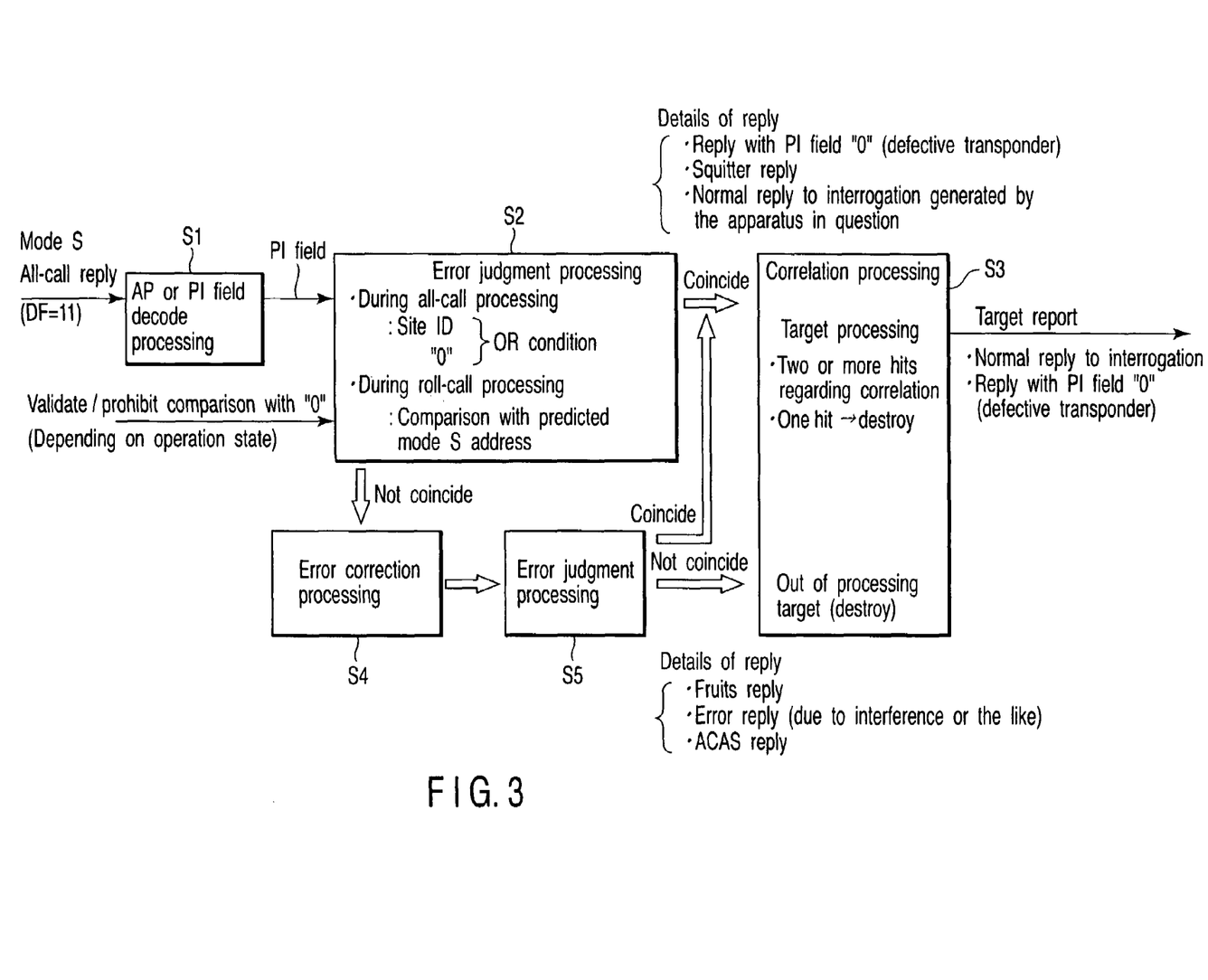
FIG. 3 is a diagram showing a processing procedure implemented by the ground system 4 of FIG. 2.

FIG. 3 is a diagram showing a processing procedure implemented by the ground system 4 of FIG. 2. In FIG. 3, decode processing of an AP field or a PI field is implemented for a received mode S all-call reply (DF=11) (step 1). Of these, error judgment processing is implemented for data of the PI field (step 2). In step 2, the data of the PI field is compared with the II (the II of the ground system 4) during all-call processing. Further, in the present embodiment, in particular, the data of the PI field is compared with the null information (i.e., numerical code "0"). When an OR condition is valid for a result of the comparison, the reply signal is acquired as the processing target in correlation processing. In other words, when a value of the PI field coincides with the II or when the value of the PI field coincides with "0", the reply signal is acquired as the processing target in the correlation processing (step 3).

On the other hand, if the OR condition is not valid in step 2, the error judgment processing is again implemented (step 5) after error correction processing with a CRC code or the like (step 4). If they do not coincide with each other even at this stage, this reply signal is excluded from processing targets and destroyed. It should be noted that as to whether or not to compare the value of the PI field with "0" in step 2 and step 5, switchover setting can be selectively performed by the switch processor 45b depending on an operation state.

In the procedure of FIG. 3, the value of the PI field is compared with "0" in the error judgment processing, in addition to the comparison between the value of the PI field and the II. When the value of the PI field coincides with the II or "0", the corresponding reply signal is targeted for processing. In that case, distinction information to find out whether the value of the PI field coincides with the II or "0" is added to the reply signal. This processing is implemented by the recognition processor 45a (FIG. 2). As a result, a defective reply in which the value of the PI field is "0", a squitter reply, and a normal reply to the interrogation signal can be targeted for processing.

Thus, the unnecessary squitter reply is also treated as the processing target, but this is destroyed in the subsequent correction processing. It is thereby possible to only acquire the replies that should normally be processed, such as the defective reply in which the value of the PI field is "0", and the normal reply to the interrogation signal generated by the system in question. Moreover, owing to the addition of the distinction information, this information can be used in subsequent processing.

Furthermore, in the procedure of FIG. 3, the comparison processing between the value of the PI field and "0" can be selectively prohibited. Thus, when the mode A/C interrogation signal is used, it can also be acquired as an ATCRBS reply, thereby enabling acquisition corresponding to the interrogation signal.

Figure 4:
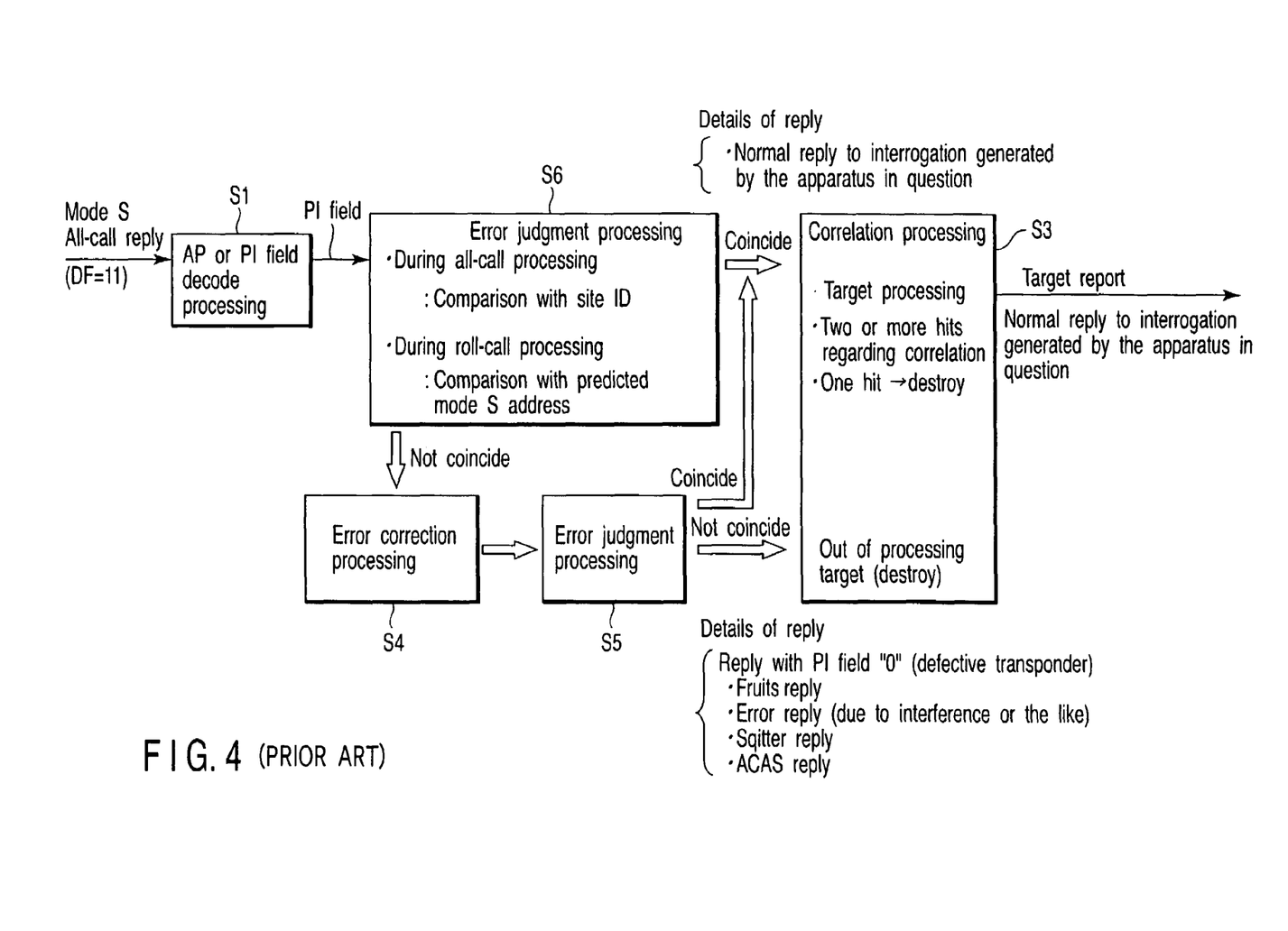
FIG. 4 is a diagram showing a processing procedure implemented by an existing secondary surveillance radar system for comparison.

FIG. 4 is a diagram showing a processing procedure implemented by an existing secondary surveillance radar system for comparison. Heretofore, in an error judgment processing procedure, the comparison between the value of the PI field and the II has only been performed during the all-call processing. Therefore, in a case of the defective reply to the all-call interrogation signal specific for mode S in which the value of the PI field is "0", the II does not coincide with the value of the PI field, so that error correction is performed in step 4. As a result, they do not coincide with each other in the repeated error judgment processing (step 5), so that this reply is destroyed and is therefore not acquired. This is similar to cases in which a fruits reply, an error reply, the squitter reply and an ACAS reply are destroyed.

Figure 5:
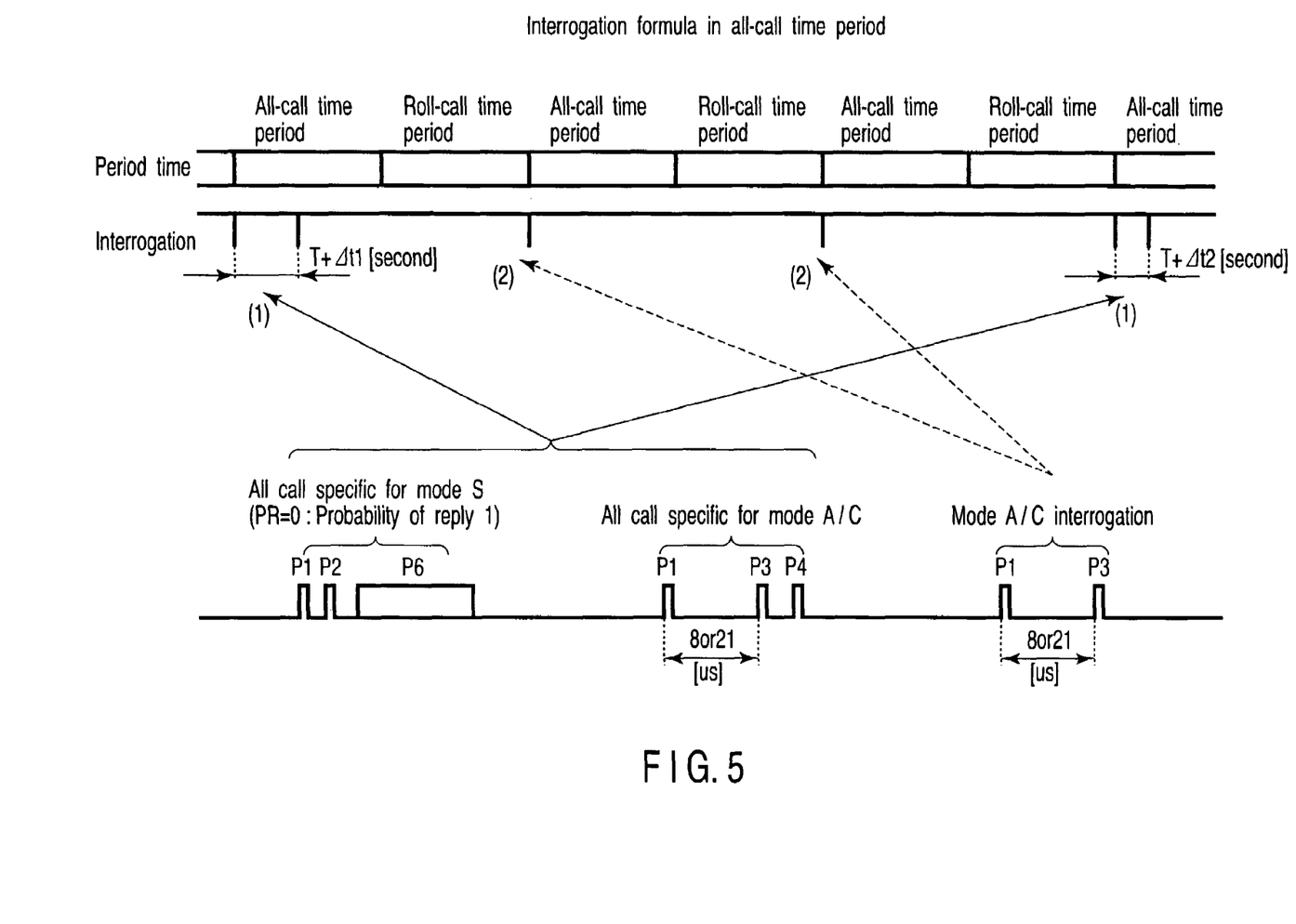
FIG. 5 is a schematic diagram showing an interrogation formula in an all-call time period for a secondary surveillance radar system according to the present invention.

FIG. 5 is a schematic diagram showing an interrogation formula in an all-call time period in the system of FIGS. 1 and 2. In the present embodiment, patterns of interrogation are changed every all-call time period, as shown in FIG. 5. That is, a pattern (1) and a pattern (2) are randomly fed (staggered). The pattern (1) is a combination of the all-call interrogation signal specific for mode S (reply probability 1: PR(Probability of reply)=0) and the all-call interrogation signal specific for mode A/C (all-call interrogation signal specific for mode A or all-call interrogation signal specific for mode C). The pattern (2) only includes the all-call interrogation signal specific for mode A/C. Further, the pattern (1) randomly changes a transmission interval between the all-call interrogation signal specific for mode S (reply probability 1: PR=0) and the all-call interrogation signal specific for mode A/C. In FIG. 5, the transmission interval is changed in such a manner as T+Δt1, T+Δt2.

In the all-call interrogation signal specific for mode S, the number of replies of the mode S transponder decreases by using other interrogation signal patterns at the same time. Thus, the interrogation signal with the reply probability 1 is always used for the mode S transponder. If so, a problem is caused when the mode S transponders overlap each other. To address this problem, the all-call interrogation signal specific for mode S is transmitted within a roll-call time period, at which moment the reply probability to the transponders is changed, so that the overlapping mode S transponders can be acquired. This makes it possible to prevent a further decrease in the number of replies to the all-call interrogation signal specific for mode S.

Figure 6:
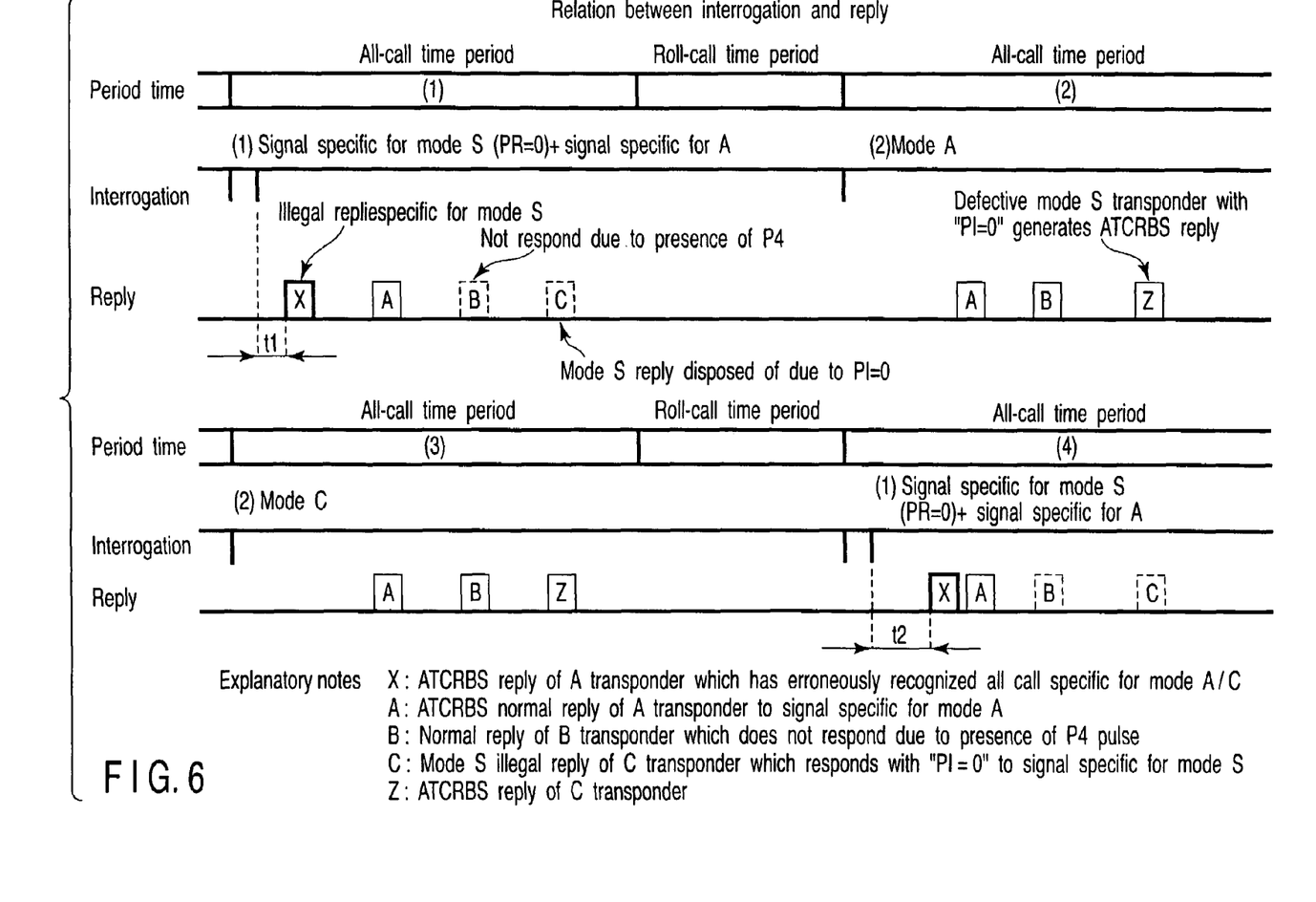
FIG. 6 is a diagram showing a relation between an interrogation signal and a reply signal in the embodiment of the present invention.

FIG. 6 is a diagram showing a relation between the interrogation signal and the reply signal in the present embodiment. As shown in the drawing, a defective mode S transponder which returns a reply signal in which the value of the PI field is "0" to the all-call interrogation signal specific for mode S responds to the mode A/C interrogation signal (pattern (2)). Therefore, this reply can be acquired as the ATCRBS reply (Z reply in FIG. 6). In the same manner, a defective ATCRBS transponder which does not respond to the all-call interrogation signal specific for mode A/C responds to the mode A/C interrogation signal (pattern (2)). Thus, this reply can also be acquired (B reply in FIG. 6).

Furthermore, an illegal reply of the defective ATCRBS transponder which erroneously recognizes the all-call interrogation signal specific for mode S is acquired in different ranges of values in accordance with an ATCRBS processing standard for an all call specific for mode S (reply probability 1: PR=0)+the all-call interrogation signal specific for mode A/C (pattern (1)) (X reply in FIG. 6). On the other hand, the normal replies to the all-call interrogation signal specific for mode A/C and the mode A/C interrogation signal are acquired in a constant range of values (A reply in FIG. 6). Therefore, the illegal reply (X reply in FIG. 6) is not recognized as the reply to the all-call interrogation signal specific for mode A/C. Then, the normal replies to the all-call interrogation signal specific for mode A/C and the interrogation signal for mode A/C are only acquired.

Next, effects obtained by the present embodiment will be described in comparison with an existing technique referring to FIG. 7 to FIG. 9.

Figure 7:
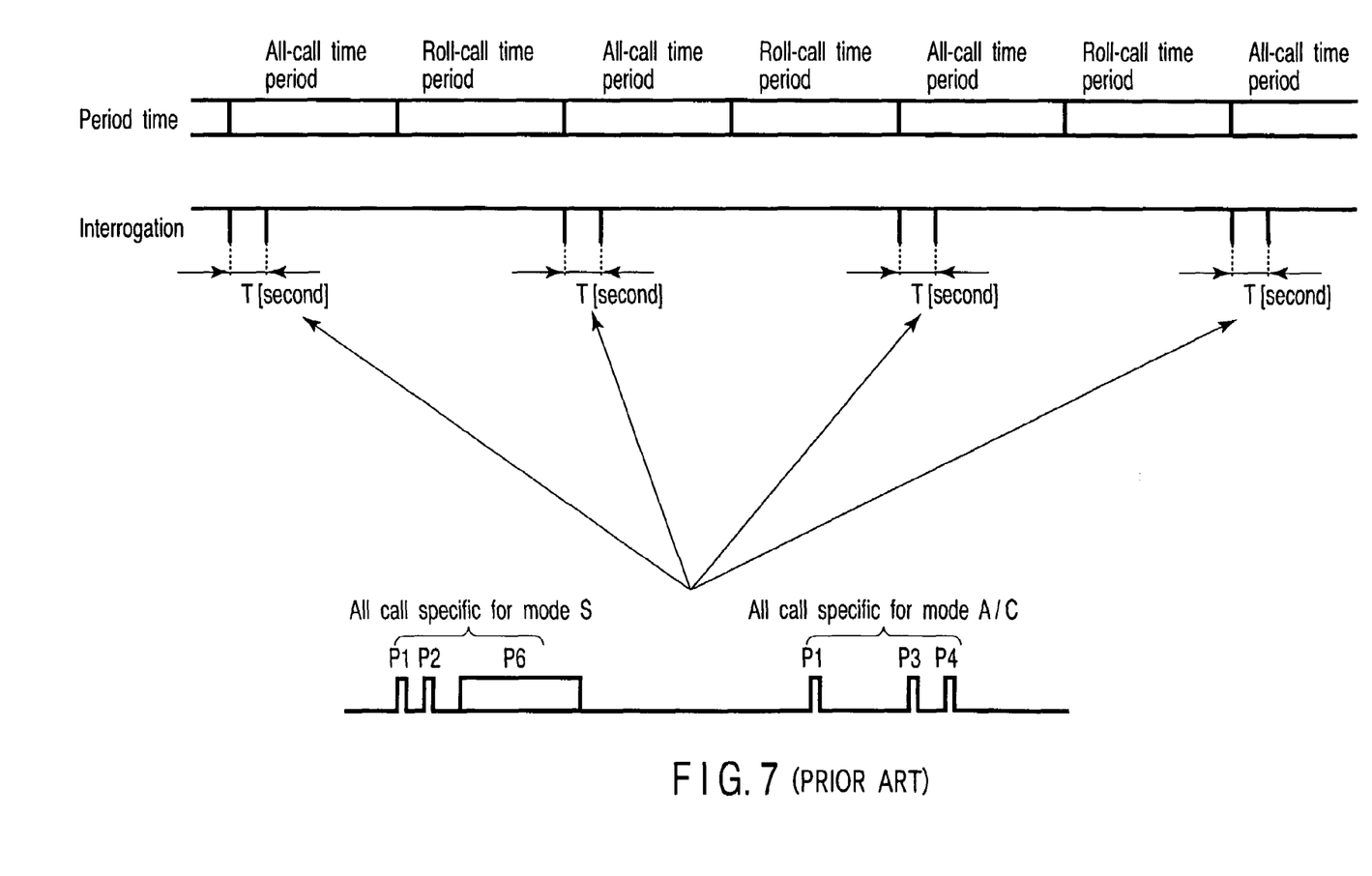
FIG. 7 is a diagram showing a relation between the interrogation signal and the reply signal in the existing secondary surveillance radar system for comparison.
Figure 8:
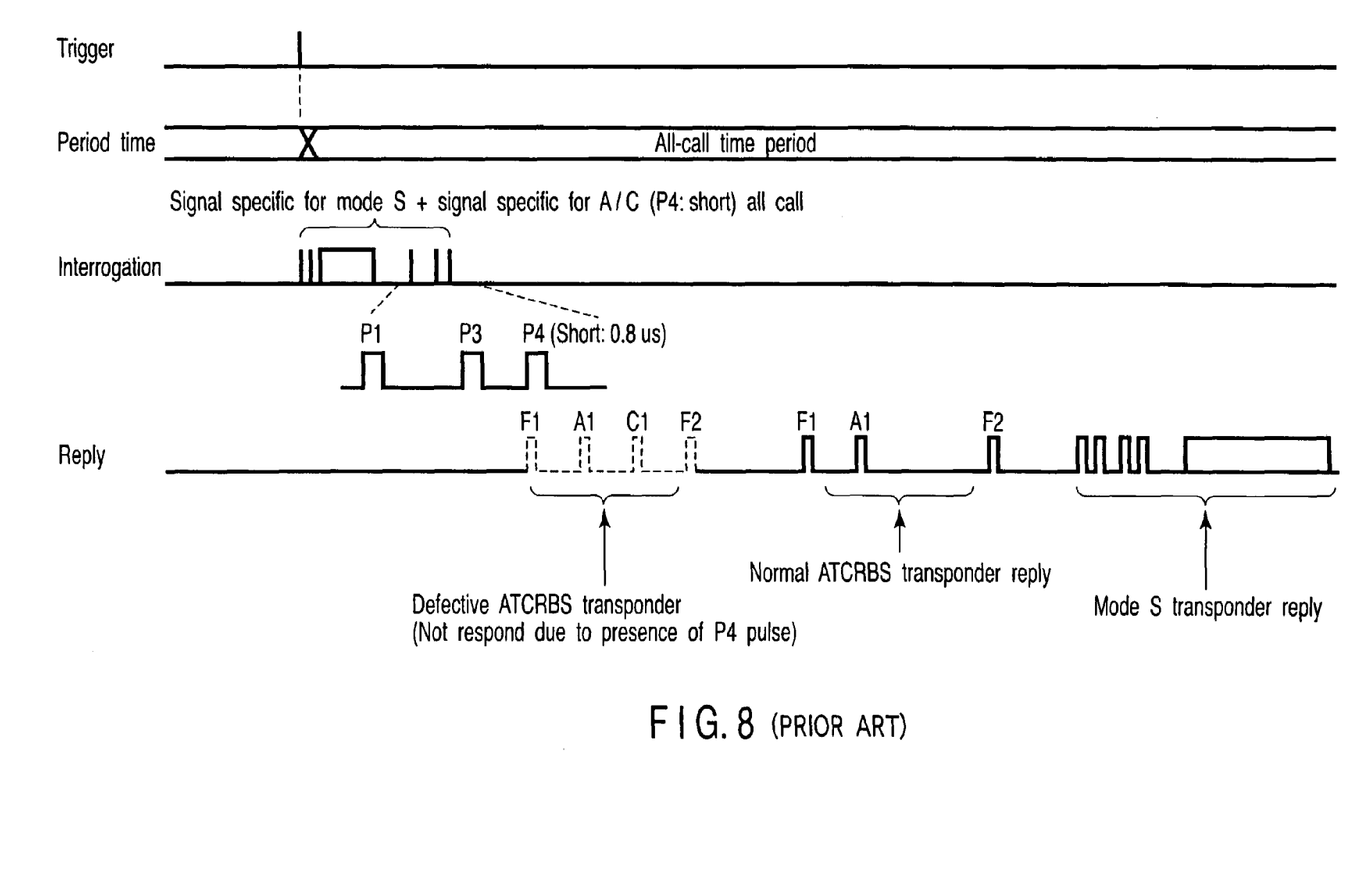
FIG. 8 is a diagram showing in greater detail the relation between the interrogation signal and the reply signal shown in FIG. 7.

FIG. 7 is a diagram showing a relation between the interrogation signal and the reply signal in the existing secondary surveillance radar system for comparison. In the existing system, the interrogation signals of the same pattern (corresponding to the pattern (1)) are transmitted at regular intervals every all-call time period. This corresponds to the fact that the transmission interval between the all-call interrogation signal specific for mode S and the all-call interrogation signal specific for mode A/C is regular, as shown in FIG. 8. In this state, if the all-call interrogation signal specific for mode S is unsuccessfully suppressed by a P2 pulse, the aircraft equipped with the defective transponder may not be acquired or the illegal reply may be acquired.

Figure 9:
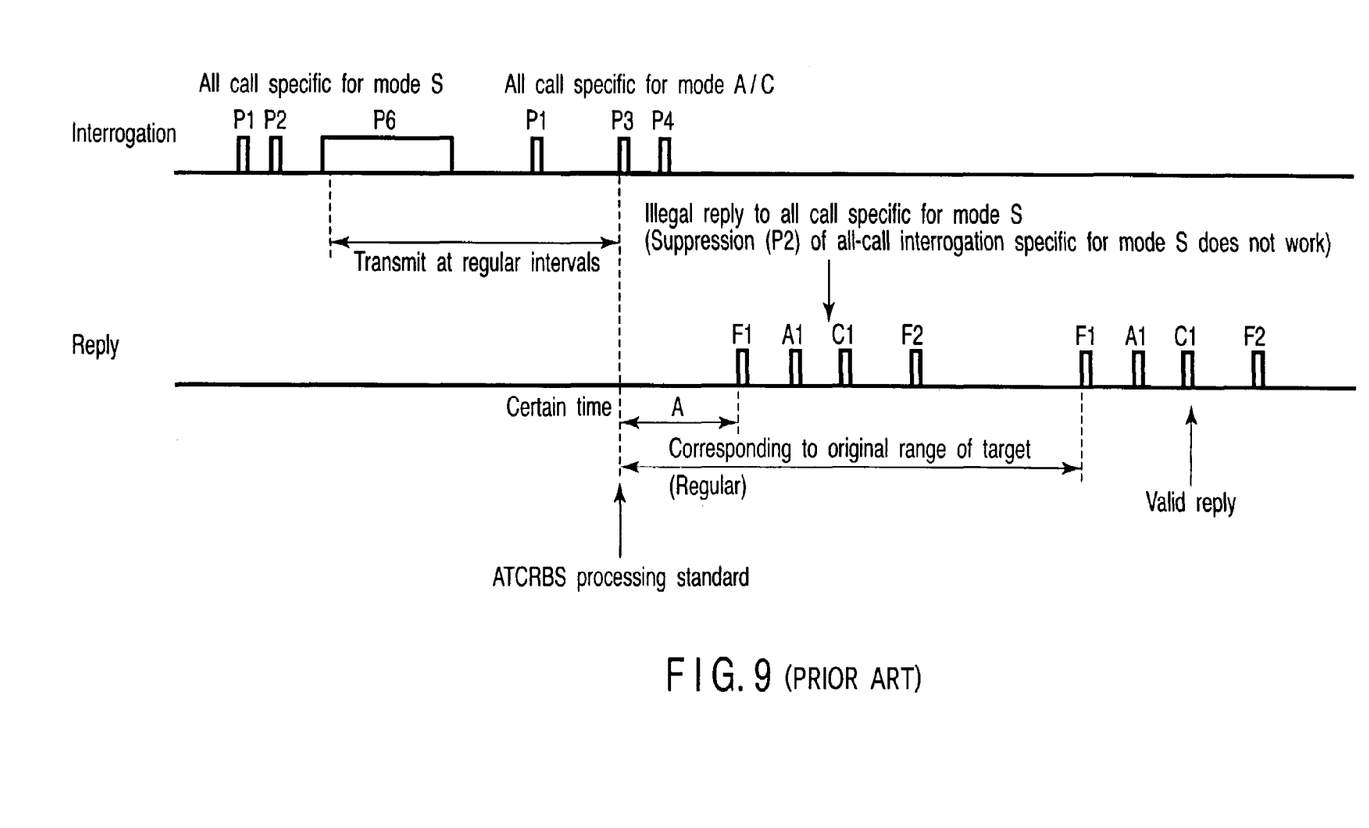
FIG. 9 is a diagram to explain trouble in the existing secondary surveillance radar system.

FIG. 9 is a diagram to explain trouble in the existing secondary surveillance radar system. As shown in the drawing, when the all-call interrogation signal specific for mode A/C including a P4 pulse is fed, some of the transponders may not return the reply signal. Since these transponders are not acquired, they might cause trouble to flight control.

On the contrary, in the present embodiment, the value of the PI field is first compared with "$_0$" in the error judgment processing, in addition to the comparison between the value of the PI field and the II. Moreover, the distinction information to find out whether the value of the PI field coincides with the II or "0" is added to the reply signal. This makes it possible to acquire the defective mode S transponder which brings the value of the PI field to "0" to respond to the all-call interrogation signal specific for mode S.

Furthermore, in the present embodiment, switchover setting can be performed so that the value of the PI field is not compared with "0" in the error judgment processing. In this way, the reply in which the value of the PI field is "0" is treated as an error reply as usual, and can also be acquired as the ATCRBS reply when the mode A/C interrogation signal is combined therewith.

Still further, in the present embodiment, an interrogation signal combined with the mode A/C interrogation signal in a conventional form is fed to the ATCRBS transponder which does not respond to the all-call interrogation signal specific for mode A/C. This makes it possible to also acquire the transponders which have heretofore not been able to be acquired.

Further yet, in the present embodiment, the transmission interval between the all-call interrogation signal specific for mode S (reply probability 1: PR=0) and the all-call interrogation signal specific for mode A/C is randomly changed. This can eliminate the illegal reply of the ATCRBS transponder to the all call specific for mode S. As a consequence, the transponders can be acquired without fail, and it is possible to provide the secondary surveillance radar system and the ground system for use therein which can enhance a contribution to safe operations of the aircrafts.

What is claimed is:

1. A secondary surveillance radar system comprising a ground system which observes an observation area where an aircraft equipped with a mode S transponder and an aircraft equipped with an ATCRBS transponder possibly coexist, wherein the ground system comprises:
a transmit processor which transmits to the observation area an all-call interrogation signal specific for mode S including an identification code of the ground system;
a receive processor which receives a reply signal to the interrogation signal transmitted by the transmit processor; and
a recognition processor which recognizes the reply signal as a processing target when identification information included in the reply signal received by the receive processor coincides with the identification code of the ground system,
wherein the recognition processor recognizes the reply signal as the processing target also when the identification information included in the reply signal received by the receive processor coincides with null information,
wherein the recognition processor gives distinguishable distinction information to the reply signal in which the identification information coincides with the identification code of the ground system and to the reply signal in which the identification information coincides with the null information, and
wherein the ground system destroys a squitter reply recognized as the processing target with correlation processing using the distinction information.

2. The secondary surveillance radar system according to claim 1, wherein the null information corresponds to a numerical code "0".

3. A secondary surveillance radar system comprising a ground system which observes an observation area where an aircraft equipped with a mode S transponder and an aircraft equipped with an ATCRBS transponder possibly coexist,
wherein the ground system comprises:
a transmit processor which transmits to the observation area an all-call interrogation signal specific for mode S including an identification code of the ground system;
a receive processor which receives a reply signal to the interrogation signal transmitted by the transmit processor; and
a recognition processor which recognizes the reply signal as a processing target when identification information included in the reply signal received by the receive processor coincides with the identification code of the ground system,
wherein the recognition processor recognizes the reply signal as the processing target also when the identification information included in the reply signal received by the receive processor coincides with null information, and
the system further comprising a switch processor which selectively switches to validate and prohibit a function performed by the recognition processor to recognize the reply signal in which the null information is described.

4. A secondary surveillance radar system comprising a ground system which observes an observation area where an aircraft equipped with a mode S transponder and an aircraft equipped with an ATCRBS transponder possibly coexist,
wherein the ground system comprises:
a transmit processor which transmits to the observation area an interrogation signal including an identification code of the ground system; and
a receive processor which receives a reply signal to the interrogation signal transmitted by the transmit processor;
wherein the transmit processor changes transmission patterns of the interrogation signal every all-call time period, and wherein the transmit processor changes a combination of an all-call interrogation signal specific for mode S, an all-call interrogation signal specific for mode A and an all-call interrogation signal specific for mode C every all-call time period.

5. A ground system for use in a secondary surveillance radar system which observes an observation area where an aircraft equipped with a mode S transponder and an aircraft equipped with an ATCRBS transponder possibly coexist, the ground system comprising:
a transmit processor which transmits to the observation area an all-call interrogation signal specific for mode S including an identification code of the ground system;
a receive processor which receives a reply signal to the interrogation signal transmitted by the transmit processor; and
a recognition processor which recognizes the reply signal as a processing target when identification information included in the reply signal received by the receive processor coincides with the identification code of the ground system,
wherein the recognition processor recognizes the reply signal as the processing target also when the identification information included in the reply signal received by the receive processor coincides with null information,
wherein the recognition processor gives distinguishable distinction information to the reply signal in which the identification information coincides with the identification code of the ground system and to the reply signal in which the identification information coincides with the null information, and
wherein the ground system destroys a squitter reply recognized as the processing target with correlation processing using the distinction information.

6. The ground system according to claim 5, wherein the null information corresponds to a numerical code "0".

7. A ground system for use in a secondary surveillance radar system which observes an observation area where an aircraft equipped with a mode S transponder and an aircraft equipped with an ATCRBS transponder possibly coexist, the ground system comprising:
a transmit processor which transmits to the observation area an all-call interrogation signal specific for mode S including an identification code of the ground system;
a receive processor which receives a reply signal to the interrogation signal transmitted by the transmit processor; and
a recognition processor which recognizes the reply signal as a processing target when identification information included in the reply signal received by the receive processor coincides with the identification code of the ground system,
wherein the recognition processor recognizes the reply signal as the processing target also when the identification information included in the reply signal received by the receive processor coincides with null information, and
the ground system further comprising a switch processor which selectively switches to validate and prohibit a function performed by the recognition processor to recognize the reply signal in which the null information is described.

8. A ground system for use in a secondary surveillance radar system which observes an observation area where an aircraft equipped with a mode S transponder and an aircraft equipped with an ATCRBS transponder possibly coexist, the ground system comprising:

a transmit processor which transmits to the observation area an interrogation signal including an identification code of the ground system; and a receive processor which receives a reply signal to the interrogation signal transmitted by the transmit processor, wherein the transmit processor changes transmission patterns of the interrogation signal every all-call time period, and wherein the transmit processor changes a combination of an all-call interrogation signal specific for mode S, an all-call interrogation signal specific for mode A and an all-call interrogation signal specific for mode C every all-call time period.

\* \* \* \* \*